(12) United States Patent
Otake et al.

(10) Patent No.: US 7,616,360 B2
(45) Date of Patent: Nov. 10, 2009

(54) IMAGE PROCESSING APPARATUS AND METHOD THEREFOR

(75) Inventors: Ritsuko Otake, Kawasaki (JP); Shinichi Kato, Kawasaki (JP); Tsutomu Sakaue, Yokohama (JP); Yoko Sato, Yokohama (JP); Yoichi Kashibuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 508 days.

(21) Appl. No.: 11/460,466

(22) Filed: Jul. 27, 2006

(65) Prior Publication Data

US 2007/0030500 A1 Feb. 8, 2007

(30) Foreign Application Priority Data

Aug. 2, 2005 (JP) ............................. 20050224595

(51) Int. Cl.
G03F 3/08 (2006.01)
G06F 15/00 (2006.01)
G06K 9/00 (2006.01)

(52) U.S. Cl. .................. 358/518; 358/1.9; 358/529; 382/167

(58) Field of Classification Search ................. 358/1.9, 358/501, 504, 515, 518, 520, 529, 530, 539; 382/162, 167, 163
See application file for complete search history.

(56) References Cited

U.S. PATENT DOCUMENTS

| | | | | |
|---|---|---|---|---|
| 5,822,503 A | * | 10/1998 | Gass et al. ................. | 358/1.9 |
| 6,703,089 B2 | * | 3/2004 | DeProspero et al. ...... | 428/32.76 |
| 7,032,517 B2 | * | 4/2006 | Bestmann .................. | 101/484 |
| 7,426,063 B2 | * | 9/2008 | Shibasaki .................. | 358/450 |
| 2002/0057833 A1 | * | 5/2002 | Gill et al. .................. | 382/162 |
| 2004/0223172 A1 | | 11/2004 | Yoshizawa et al. | |
| 2005/0052666 A1 | * | 3/2005 | Yamamoto et al. ......... | 358/1.9 |
| 2005/0062757 A1 | * | 3/2005 | Nakamori .................. | 345/604 |
| 2005/0150411 A1 | * | 7/2005 | Bestmann .................. | 101/484 |
| 2007/0024880 A1 | | 2/2007 | Sato et al. .................. | 358/1.9 |
| 2007/0046961 A1 | | 3/2007 | Kashibuchi et al. ........ | 358/1.9 |

(Continued)

FOREIGN PATENT DOCUMENTS

JP 2001-61076 3/2001

(Continued)

OTHER PUBLICATIONS

Office Action, dated Dec. 5, 2008, in JP 2005-224595.

*Primary Examiner*—Madeleine A Nguyen
(74) *Attorney, Agent, or Firm*—Fitzpatrick, Cella, Harper & Scinto

(57) ABSTRACT

When color materials of more than four colors are used, a signal for the amount of toner used within a range appropriate for the apparatus and toner characteristic is generated using a color separation table. However, a printer receives print data of various formats, such as image data separated into signal values of more than four colors, or image data of a special format to which a six-color separation table cannot be applied. Hence, an image signal representing a combination of colors is input. The sum of the signal values of colors in each pixel of the image signal is calculated and compared with a limit value. When the sum exceeds the limit value, the signal values of base colors are replaced with that of a spot color based on a replacement table for replacing the signal values of the base colors with that of the spot color.

19 Claims, 17 Drawing Sheets

U.S. PATENT DOCUMENTS

2007/0121131 A1* 5/2007 Hauser ................... 358/1.9
2007/0273917 A1* 11/2007 Encrenaz et al. .......... 358/1.15

FOREIGN PATENT DOCUMENTS

| JP | 2002-154239 | 5/2002 |
| JP | 2002-154240 | 5/2002 |
| JP | 2004-058624 | 2/2004 |
| JP | 2004-314490 | 11/2004 |
| JP | 2005-101934 | 4/2005 |

* cited by examiner

FIG. 4

| MIXTURE RATIO | | | ADJUSTMENT VALUE | REPLACEABLE TONER COLOR |
| --- | --- | --- | --- | --- |
| A COLOR | B COLOR | C COLOR | | |
| a1 | b1 | c1 | α1 | S1 |
| a2 | b2 | c2 | α2 | S2 |

FIG. 10

| MIXTURE RATIO | | | ADJUSTMENT VALUE α | REPLACEABLE TONER COLOR |
|---|---|---|---|---|
| C | M | Y | | |
| 0 | 1 | 1 | 1.0 | R |
| 1 | 0 | 1 | 1.0 | G |

F I G. 12

| MIXTURE RATIO | | | ADJUSTMENT VALUE $\alpha$ | REPLACEABLE TONER COLOR |
|---|---|---|---|---|
| C | M | Y | | |
| 0 | 1 | 1 | 1.0 | R |
| 1 | 0 | 1 | 1.0 | G |
| 1 | 1 | 1 | 1.0 | K |

FIG. 16

| PDL OBJECT | | PRIORITY IS GIVEN TO REPLACEMENT WITH BLACK | |
|---|---|---|---|
| | | PRIORITY IS GIVEN | NO PRIORITY IS GIVEN |
| PDL OBJECT | TEXT | ○ | |
| | LINE | ○ | |
| | GRAPHICS | | ○ |
| | IMAGE | | ○ |
| RASTER IMAGE | TEXT AREA | ○ | |
| | INSIDE TEXT | ○ | |
| | PHOTOGRAPH AREA | | ○ |

FIG. 17

| | PRIORITY IS GIVEN TO REPLACEMENT WITH BLACK | |
|---|---|---|
| | PRIORITY IS GIVEN | NO PRIORITY IS GIVEN |
| FACSIMILE | ○ | |
| INTERNET FAX | ○ | |
| OTHER MEANS | | ○ |

IMAGE PROCESSING APPARATUS AND METHOD THEREFOR

BACKGROUND OF THE INVENTION

1. Field of the Invention

The present invention relates to image processing for image signals representing a plurality of base colors or image signals representing a combination of colors including base colors and spot colors.

2. Description of the Related Art

Recently, the digital printing technique is certainly increasing its utility value on the on-demand printing market and a printing market for small numbers of copies. In particular, full-color printing using electrophotography is superior other printing techniques in productivity, printing cost, ease of maintenance, and the like, and is quickly expanding its market. A great deal of attention is paid not only to conventional electrophotographic full-color printing using the toners of four, C, M, Y, and K base colors (called process colors), but also to multicolor printing. Multicolor printing uses the toners of spot colors having special color reproduction, such as red R, green G, blue B, orange O, and light colors, in addition to the process colors.

In inkjet printers, a printing technique using spot color inks in addition to the four base color inks has already been developed and commercialized, and many signal generation methods for this technique have been proposed. For example, Japanese Patent Laid-Open Nos. 2002-154239 and 2002-154240 disclose a technique of replacing M and C with blue (B) ink in order to reduce graininess.

As a feature of electrophotography, if the toner amount attached per unit area is too large, scattering of toner, winding of print paper around the fixing mechanism, and the like occur. These problems degrade the image quality, and may damage the apparatus. As a technique for suppressing these problems, there is proposed a method of converting a toner amount used per pixel to a predetermined value or less in accordance with the apparatus and toner characteristic. This method is disclosed in, e.g., Japanese Patent Laid-Open No. 2005-101934.

As a signal processing technique which assumes electrophotography using toners of more than four colors, for example, Japanese Patent Laid-Open No. 2004-58624 discloses a technique of generating a color separation table when the toners of six colors are used. This technique generates a six-color separation table for using light cyan c and light magenta m by separating C and M signals on the basis of a CMYK color separation table and the colorimetric value of a material actually printed within the range of a specified amount of toner used. This six-color separation table is used to control the toner consumption amount.

When toners of more than four colors are used, a signal value corresponding to the amount of toner used within a range appropriate for the apparatus and toner characteristic can be generated by applying the above-described color separation table to general image processing.

However, the printer receives print data of various formats. The printer may need to treat image data which has already been separated into signal values of more than four colors upon reception, or image data of a special format to which the six-color separation table cannot be applied.

When color separation processing prepared in advance by converting image data of a special format is applied, the total toner amount may exceed the upper limit value of the apparatus, or color reproduction performance may deteriorate. An example of image data of a special format is image data in the DeviceN color space of PostScript®. Note that the DeviceN color space is expressed by n components (n-colors). Image data separated into multiple colors by a unique definition is also image data of a special format.

When signal processing using the color materials of spot colors in inkjet printing is applied to electrophotographic full-color printing, toner images of the spot colors are formed on a transfer member in addition to C, M, Y, and K toner images. These toner images are transferred onto print paper, heated, and fixed. As the total toner amount increases along with an increase in the number of toner colors, a large load is applied to each process in the electrophotographic process.

SUMMARY OF THE INVENTION

The first aspect of the present invention discloses an image processing apparatus comprising:

an input section, arranged to input an image signal representing a combination of colors including base colors and a spot color;

a comparator, arranged to calculate a sum of signal values of colors in each pixel of the image signal, and compare the sum of the signal values with a limit value; and a replacement section, arranged to, when the sum exceeds the limit value, replace signal values of the base colors with a signal value of the spot color on the basis of a replacement table for replacing the signal values of the base colors with the signal value of the spot color.

The second aspect of the present invention discloses an image processing apparatus comprising:

an input section, arranged to input an image signal representing process colors;

a comparator, arranged to calculate a sum of signal values of colors in each pixel of the image signal, and compare the sum of the signal values with an upper limit value; and a replacement section, arranged to, when the sum exceeds the upper limit value, replace signal values of the process colors with a signal value of a spot color on the basis of a replacement table for replacing the signal values of the process colors with the signal value of the spot color different from the process colors.

The third aspect of the present invention discloses an image processing method comprising the steps of:

inputting an image signal representing a combination of colors including base colors and a spot color;

calculating a sum of signal values of colors in each pixel of the image signal to compare the sum of the signal values with a limit value; and when the sum exceeds the limit value, replacing signal values of the base colors with a signal value of the spot color on the basis of a replacement table for replacing the signal values of the base colors with the signal value of the spot color.

The fourth aspect of the present invention discloses An image processing method comprising the steps of:

inputting an image signal representing process colors;

calculating a sum of signal values of colors in each pixel of the image signal to compare the sum of the signal values with an upper limit value; and when the sum exceeds the upper limit value, replacing signal values of the process colors with a signal value of a spot color on the basis of a replacement table for replacing the signal values of the process colors with the signal value of the spot color different from the process colors.

According to the present invention, the total amount of color materials used can be suppressed within the limit (upper limit) in processing image signals representing a plurality of base colors or image signals representing a combination of colors including base colors and spot colors.

Further features of the present invention will become apparent from the following description of exemplary embodiments with reference to the attached drawings.

BRIEF DESCRIPTION OF THE DRAWINGS

FIG. 4 is a table showing a table representing that a combination of the pixel values of colors can be replaced with the pixel value of a given toner color (spot color);

FIG. 10 is a table showing a concrete example of a replacement table for a replaceable toner color;

FIG. 12 is a table showing an example of a table containing replacement with K toner according to the second embodiment;

FIG. 16 is a table showing an example of a switching condition table representing whether to give priority to replacement with K toner; and FIG. 17 is a table showing an example of a table for switching, on the basis of the communication protocol, whether to give priority to replacement with K toner.

DESCRIPTION OF THE EMBODIMENTS

Image processing according to preferred embodiments of the present invention will be described in detail below with reference to the accompanying drawings.

First Embodiment

Configuration of Image Forming Apparatus

Figure 1:
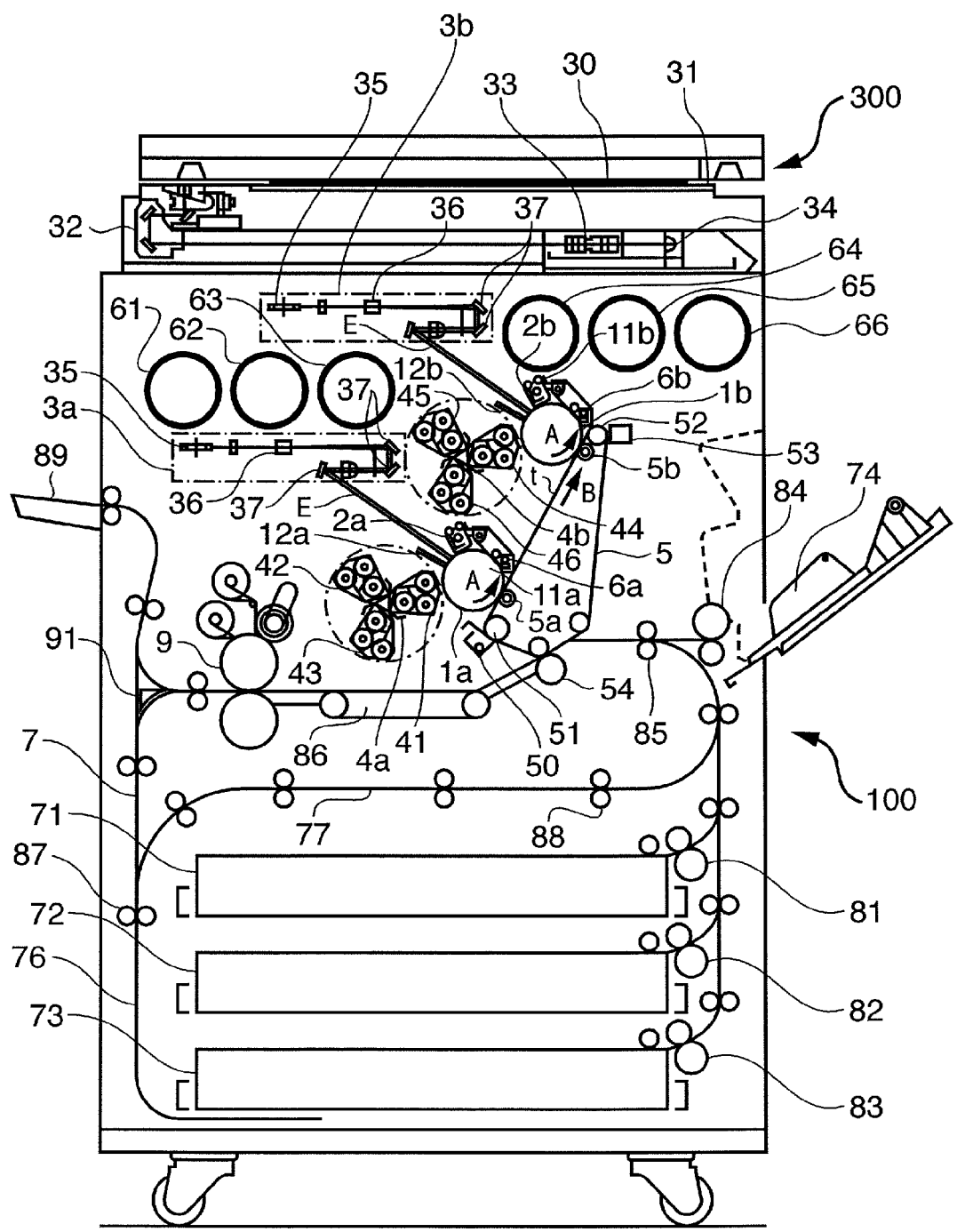
FIG. 1 is a schematic view showing a full-color image forming apparatus according to an embodiment.

FIG. 1 is a schematic view showing a full-color image forming apparatus (to be referred to as an "image forming apparatus" hereinafter) according to the embodiment.

The image forming apparatus has a reader 300 as the upper part and a printer 100 as the lower part.

The reader 300 exposes a document 30 set on a glass document table 31 with light from the lamp of a scanner unit 32, and moves the scanner unit 32 in the sub-scanning direction. Light reflected by the document 30 converges on a CCD sensor 34 via the mirror of the scanner unit 32 and a lens 33. Color-separated image signals output from the CCD sensor 34 are amplified by an amplifier circuit (not shown), and converted into R, G, and B image data by a video processing unit (not shown). The R, G, and B image data are stored in an image memory (not shown), and then output to the printer 100.

Note that the printer 100 receives image data output from the reader 300, also receives image data from a computer via a network, and receives a facsimile image signal via a telephone line. The operation of the printer 100 for image data output from the reader 300 will be described below as a typical example.

The printer 100 has roughly two image forming sections: the first image forming section including a photosensitive drum 1a, and the second image forming section including a photosensitive drum 1b. These image forming sections have almost the same configuration (shape) for the purpose of cost reduction. That is, developing units 41 to 46 (to be described later) also have almost the same configuration and shape, and the printer 100 can operate even if the developing units 41 to 46 are exchanged.

The two photosensitive drums 1a and 1b serving as image carriers are held rotatably in directions indicated by arrows A shown in FIG. 1. The photosensitive drums 1a and 1b are surrounded with the following building components. The exposure system is made up of pre-exposure lamps 11a and 11b, corona chargers 2a and 2b, exposure portions 3a and 3b of the optical system, and potential sensors 12a and 12b. The developing system is made up of moving members (developing rotaries) 4a and 4b serving as holding portions for rotary developing units, three developing units 41 to 43 and three developing units 44 to 46 which store developing materials of different colors in the corresponding holding portions, primary transfer rollers 5a and 5b, and cleaning units 6a and 6b.

For higher image quality, the number of developing units suffices to be five or more, and the first embodiment uses the six developing units 41 to 46. Toners stored in the respective developing units are as follows:

magenta toner in the developing unit 41;
cyan toner in the developing unit 42;
light magenta toner in the developing unit 43;
yellow toner in the developing unit 44;
black toner in the developing unit 45; and
light cyan toner the developing unit 46.

The developing materials (color materials) of dark and light colors are prepared by adjusting the amounts of pigments having the same spectral characteristic. More specifically, light magenta toner contains a pigment, which has the same spectral characteristic as that of magenta toner but has a smaller pigment content. Similarly, light cyan toner contains a pigment, which has the same spectral characteristic as that of cyan toner but has a smaller pigment content. Further, a developing unit for the toner of a spot color such as red or green may be mounted instead of a light toner.

In addition, the developing rotaries 4a and 4b can also hold developing units (identical in shape to the above-mentioned developing units) which store toners (e.g., metallic toners such as gold and silver, and a fluorescent color toner including a fluorescent material) different in pigment spectral characteristic from cyan, magenta, yellow, and black.

In this case, spot colors include light colors (e.g., light cyan and light magenta), red, green, fluorescent colors containing fluorescent materials, a transparent color, gold, and silver.

Each developing unit stores a two-component developing material using a mixture of toner and carrier, but even a one-component developing material formed from only toner can be adopted without any problem.

The use of dark and light colors of magenta and cyan aims to dramatically improve the reproduction performance of a light-color image, in other words, to reduce the graininess of a light-color area.

In forming an image, the photosensitive drums 1*a* and 1*b* rotate in the directions indicated by the arrows A, are discharged by the pre-exposure lamps 11*a* and 11*b*, and uniformly charged on the surfaces by the chargers 2*a* and 2*b*. The exposure portions 3*a* and 3*b* convert image data input from the reader 300 into optical signals by laser output portions (not shown). The optical signals (laser beams E) are reflected by polygon mirrors 35 to irradiate exposure positions on the surfaces of the photosensitive drums 1*a* and 1*b* via lenses 36 and reflecting mirrors 37. As a result, electrostatic latent images are formed for each toner color (separated color) on the photosensitive drums 1*a* and 1*b*.

Then, the developing rotaries 4*a* and 4*b* are rotated to move the developing units 41 and 44 to developing positions on the photosensitive drums 1*a* and 1*b*. The developing units 41 and 44 are operated (the developing bias is applied to the developing units 41 and 44) to develop the electrostatic latent images on the photosensitive drums 1*a* and 1*b*. Images of developing materials (toner images) containing a resin and pigment as a substrate are formed on the photosensitive drums 1*a* and 1*b*. The electrostatic latent images are developed by the developing units 42 and 45 in the next developing and by the developing units 43 and 46 in the second next developing.

Note that the developing units 41 to 46 are refilled with toners at predetermined timings on occasion from toner storage portions (hoppers) 61 to 66 for the respective colors which are arranged between the exposure portions 3*a* and 3*b* or beside the exposure portion 3*b*, so as to keep the toner ratio (or toner amount) in each developing unit constant.

Toner images formed on the photosensitive drums 1*a* and 1*b* are sequentially transferred by the primary transfer rollers 5*a* and 5*b* onto an intermediate transfer member (intermediate transfer belt) 5 serving as a transfer medium, so that they are superposed on each other. At this time, the primary transfer bias is applied to the primary transfer rollers 5*a* and 5*b*.

The photosensitive drums 1*a* and 1*b* are arranged in contact with a flat surface (transfer surface) formed by the intermediate transfer member 5 which is looped between a driving roller 51 and a driven roller 52 and driven in a direction indicated by an arrow B shown in FIG. 1. The primary transfer rollers 5*a* and 5*b* are arranged at positions facing the photosensitive drums 1*a* and 1*b*.

A sensor 53 which detects positional errors and the densities of images transferred from the photosensitive drums 1*a* and 1*b* is arranged at a position facing the driven roller 52. Control to correct the image density of the image forming section, the toner refill amount, the image write timing, the image write start position, and the like is performed as needed on the basis of information obtained by the sensor 53.

After the above-described formation, developing, and primary transfer of electrostatic latent images are repeated three times in the two image forming sections, a full-color toner image of sequentially superposed toner images of the six colors is formed on the intermediate transfer member 5. The full-color toner image on the intermediate transfer member 5 is secondarily transferred at once on a print sheet. At this time, the secondary transfer bias is applied to a secondary transfer roller 54.

A transfer cleaning device 50 is arranged at a position facing the driving roller 51. The transfer cleaning device 50 removes toner left on the intermediate transfer member 5 after the end of secondary transfer. The driving roller 51 pushes the intermediate transfer member 5 toward the transfer cleaning device 50 to bring the former 5 into contact with the latter and clean the intermediate transfer member 5. After the end of cleaning, the intermediate transfer member 5 moves apart from the transfer cleaning device 50. The cleaned intermediate transfer member 5 prepares for the next image formation.

Print sheets are conveyed one by one to the image forming section from a print sheet cassette 71, 72, or 73 or a manual feed tray 74 by a pickup roller 81, 82, 83, or 84. A skew is corrected by registration rollers 85, and a print sheet is supplied to the secondary transfer position in synchronism with the sheet feed timing.

A print sheet on which a full-color toner image is transferred is conveyed by a convey belt 86, and the toner image is fixed by a heat roller fixing unit 9. Thereafter, the print sheet is discharged onto a delivery tray 89 or a post-processing apparatus (not shown).

When images are formed on the two surfaces of a print sheet, a convey path switching guide 91 is driven to guide a print sheet having passed through the heat roller fixing unit 9 to a reverse path 76 via a vertical convey path 7. Then, a reverse roller 87 is rotated in the opposite direction to set the trailing end of the print sheet guided to the reverse path 76 as the leading end. The print sheet is withdrawn from the reverse path 76 and guided to a double-sided convey path 77. The print sheet passes through the double-sided convey path 77, and is sent to the registration rollers 85 by double-sided convey rollers 88. A full-color image is formed on the other surface of the print sheet by the above-described image forming process.

[Controller]

Figure 2:
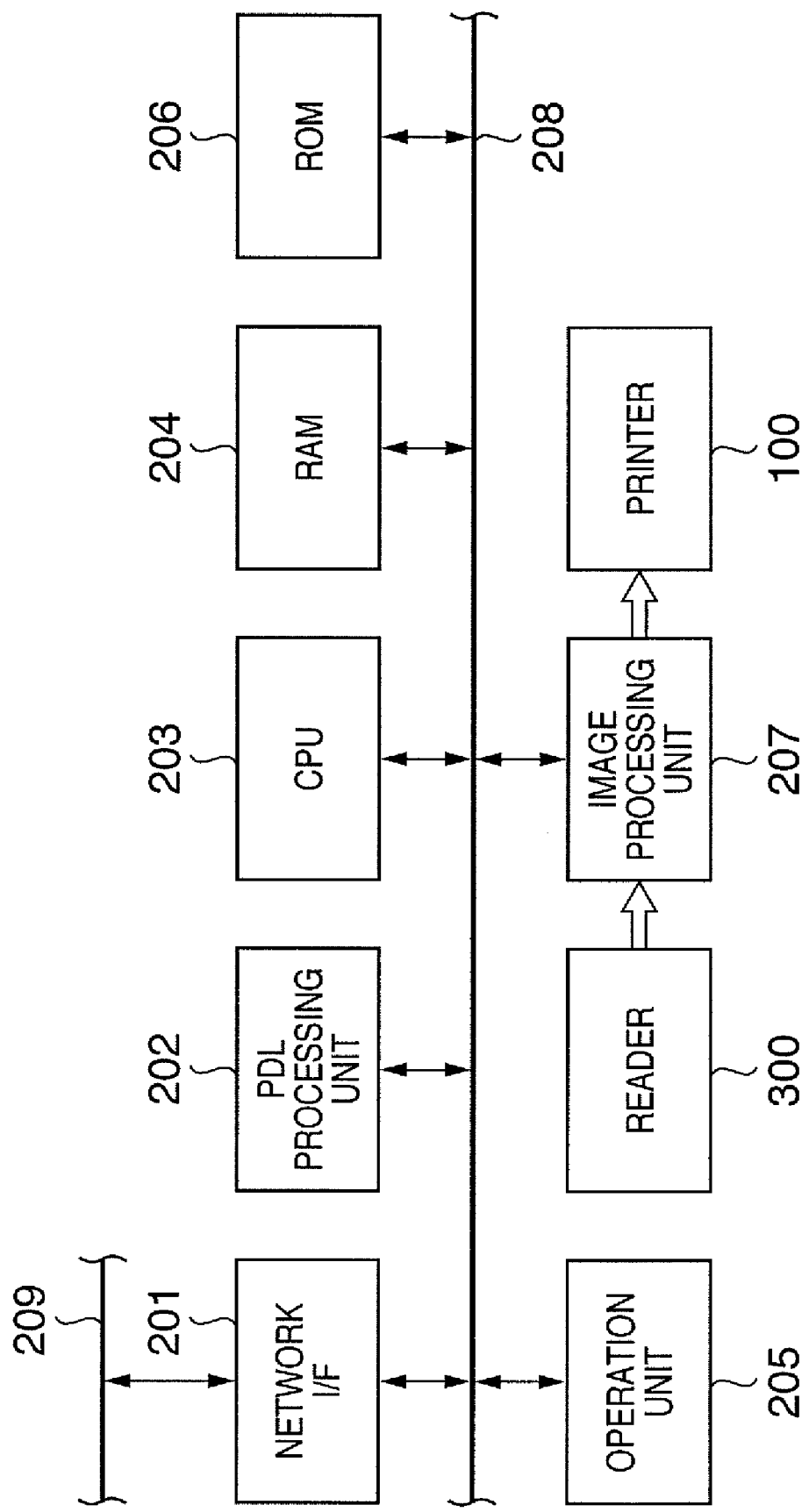
FIG. 2 is a block diagram showing the configuration of a controller which controls the image forming apparatus shown in FIG. 1.

FIG. 2 is a block diagram showing the configuration of a controller which controls the image forming apparatus shown in FIG. 1.

A CPU 203 of the controller uses a RAM 204 as a work memory, and executes programs stored in a ROM 206 to control building components (to be described below) via a system bus 208.

An operation unit 205 receives an instruction from the user, notifies the CPU 203 of it, and displays the apparatus state or the like under the control of the CPU 203. When the user designates a job containing read of an image such as copying of an image via the operation unit 205, the CPU 203 controls the reader 300 to input image data obtained by reading a document image to an image processing unit 207.

The image processing unit 207 performs image processing corresponding to the job for the received image data. For example, for a copy job, the image processing unit 207 performs image processing suitable for a printer output for image data input from the reader 300, and outputs the processed image data to the printer 100.

Although not shown in FIG. 2, the system bus 208, reader 300, and printer 100 are connected to each other via a predetermined interface. The CPU 203 can acquire status information representing the operation states of the reader 300 and printer 100 to control their operations.

A network interface (I/F) 201 is connected to a network 209 such as a local area network (LAN), communicates with a computer and server connected to the network 209, and exchanges various commands and data. For example, when a print job containing image data (to be referred to as "PDL data" hereinafter) described in a description language such as a page description language is received from an external computer, the CPU 203 supplies the PDL data to a PDL processing unit 202. The PDL processing unit 202 transfers, to the image processing unit 207, image data rendered by interpreting the PDL data. The image processing unit 207 performs image processing appropriate for a printer output for the input image data, and outputs the processed image data to the printer 100. Accordingly, the print job is executed.

When a scan job is received from an external computer, the CPU 203 causes the reader 300 to read an image. The CPU 203 causes the image processing unit 207 to generate image data corresponding to the read image, and transmits the image data via the network I/F 201 to the destination such as the computer which has issued the scan Job. Note that the image data is generated in a data format designated by the scan job.

The controller further incorporates a facsimile transmission/reception unit, an interface with a telephone line, and the like, but a description of them will be omitted.

[Image Processing Unit]

Figure 3:
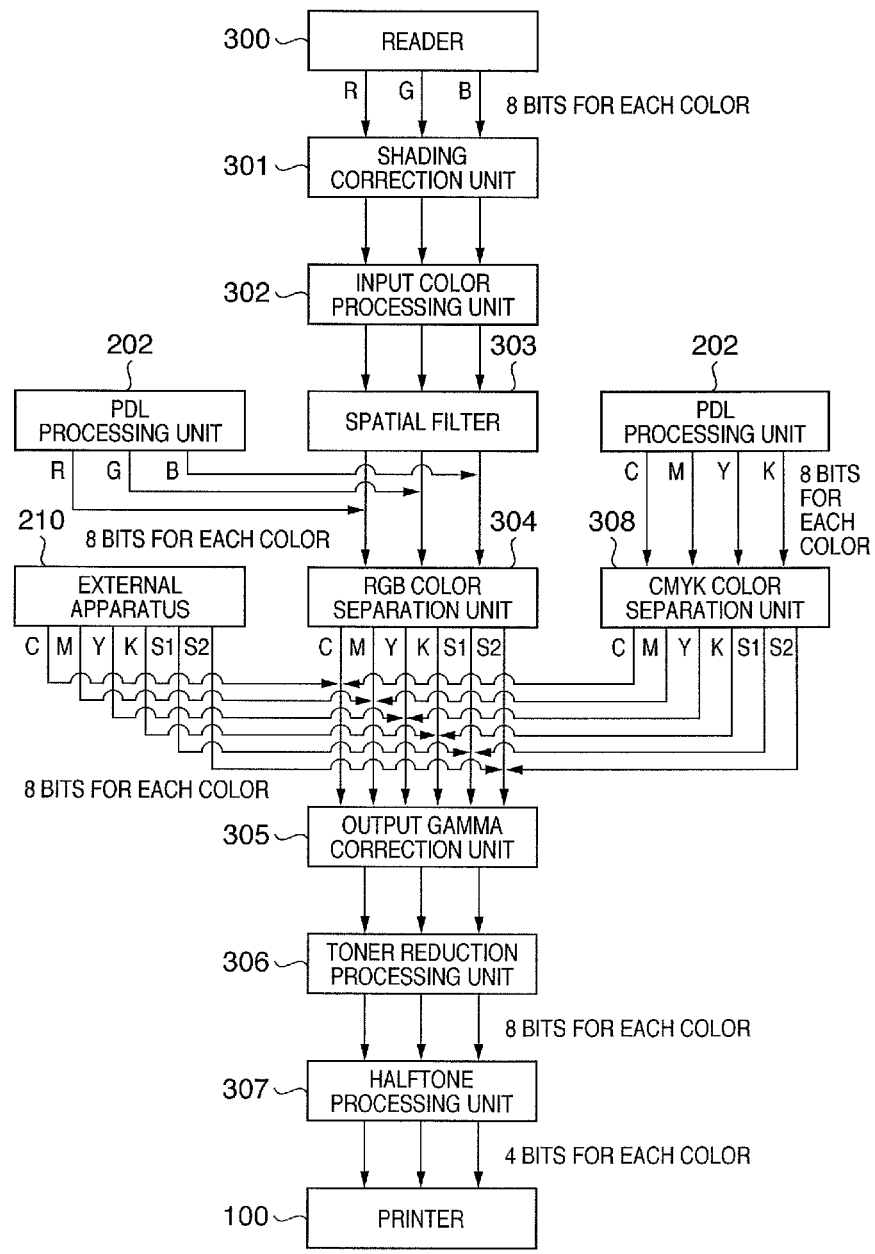
FIG. 3 is a block diagram showing the configuration of an image processing unit.

FIG. 3 is a block diagram showing the functional configuration of the image processing unit 207.

In many cases, image data output from the reader 300 is RGB image data of 8 bits (256 tone levels) per pixel. In the image processing unit 207, input RGB image data undergoes white level correction by a shading correction unit 301, and input masking processing by an input color processing unit 302. These processes remove color grayness and the like generated by the spectral characteristic of the CCD. Further, the frequency of the input image data is corrected by a spatial filter 303.

In the image processing unit 207, RGB image data obtained by the above processing or RGB image data (8 bits for each color) generated by the PDL processing unit 202 is separated into six, C, M, Y, K, S1, and S2 color signals (8 bits for each color) by an RGB color separation unit 304. The PDL processing unit 202 sometimes outputs CMYK image data. In this case, CMYK image data is separated into six, C, M, Y, K, S1, and S2 color signals by a CMYK color separation unit 308. Further, C, M, Y, K, S1, and S2 signals may be directly input from an external computer (external apparatus 210).

The RGB color separation unit 304 and CMYK color separation unit 308 respectively separate RGB and CMYK image data each into C, M, Y, K, S1, and S2 by direct mapping. Note that methods and coefficients which can be applied to other devices to a certain degree may be set for color separation processing by the RGB color separation unit 304 and CMYK color separation unit 308, and individual device characteristics may be absorbed by a toner reduction processing unit 306 (to be described later).

In the image processing unit 207, the six color signals are input to an output gamma correction unit 305. The output gamma correction unit 305 corrects (gamma correction) the output characteristic of each color-separated signal by using a one-dimensional lookup table (1DLUT) independent for each color. The toner reduction processing unit 306 executes toner reduction processing to make the sum of signal values per pixel fall within a predetermined limit. Details of the toner reduction processing will be described later.

A halftone processing unit 307 performs, for the color-separated signal, pseudo halftone processing corresponding to the number of tones and the resolution which can be reproduced by the printer 100. The image processing unit 207 outputs the C, M, Y, and K signals or C, M, Y, K, S1, and S2 signals having undergone the pseudo halftone processing to the printer 100. Note that the number of tones and the resolution of the printer 100 are, e.g., 4 bits and 600 dpi, but are not limited to them. Pseudo halftone processing uses well-known screen ruling or error diffusion.

Replacement of a pixel value with a spot color toner and toner reduction when a developing unit for the toner of a spot color such as red or green is mounted instead of the above-mentioned light toner will be explained.

[Generation of Replaceable Toner Color Signal]

FIG. 4 is a table showing a table representing that a combination of the pixel values of colors can be replaced with the pixel value of a given toner color (spot color). FIG. 4 shows that, when the color component values of a pixel represent a mixture ratio of A color:B color:C color=a1:b1:c1, the product of the pixel values by an adjustment value α1 can be replaced with the value of a color component S1. That is, letting A, B, and C be the values of color components, the values of the color components S1 and S2 are given by $$S1 = \alpha 1 \cdot (A \times a1 + B \times b1 + C \times c1)/(a1+b1+c1)$$

$$S2 = \alpha 2 \cdot (A \times a2 + B \times b2 + C \times c2)/(a2+b2+c2) \quad (1)$$

Note that the color component signals S1 and S2 will be called replaceable toner color signals. The toner reduction processing unit 306 executes replaceable color component removal processing (to be referred to as "replaceable color removal (RCR) processing" hereinafter), similar to under color removal (UCR) processing, on the basis of the table shown in FIG. 4. A, B, and C colors are prepared by excluding black from base colors used to print an image. For example, when the base colors are process colors, A, B, and C colors correspond to cyan, magenta, and yellow except black.

[Toner Reduction Processing]

Figure 5:
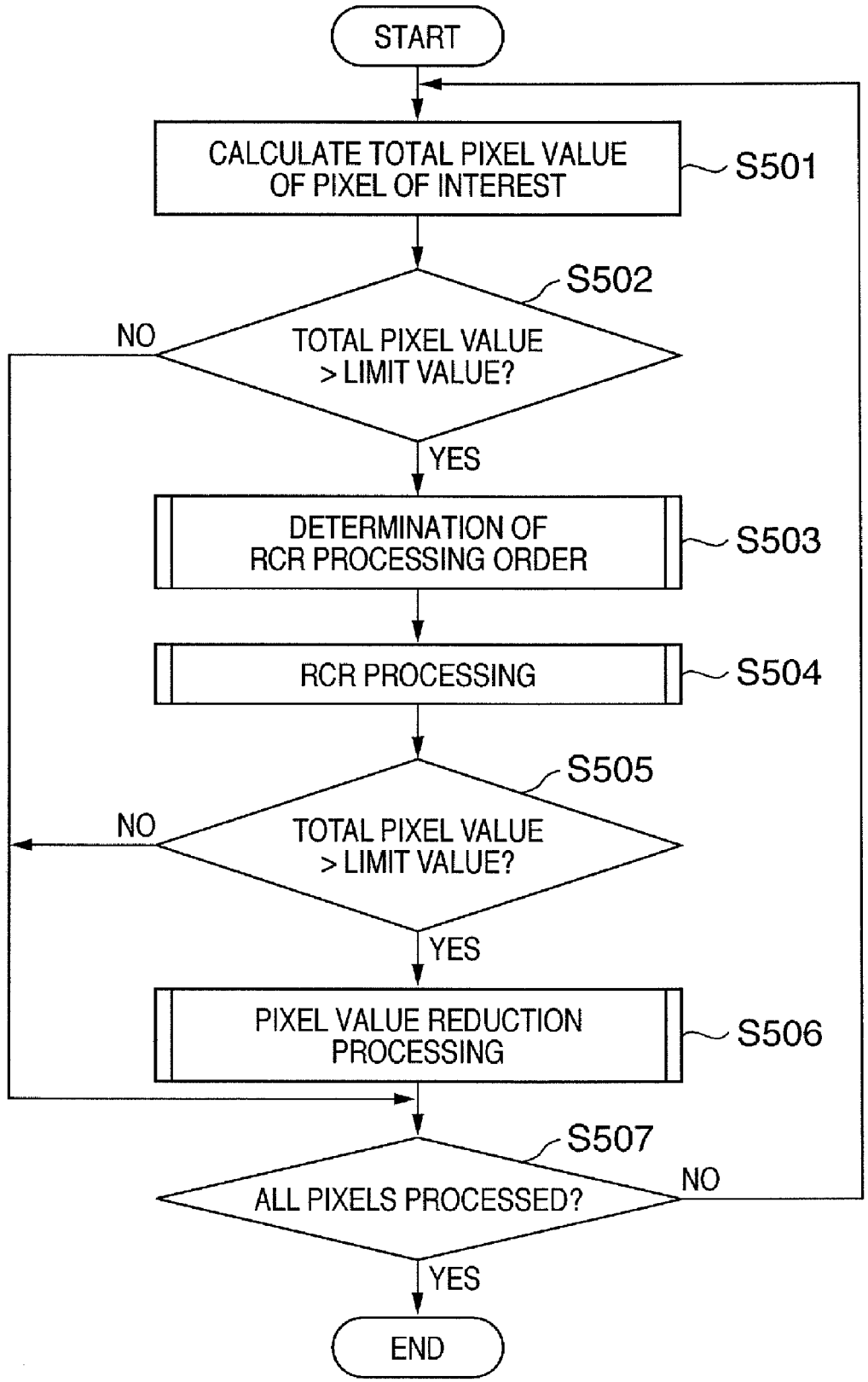
FIG. 5 is a flowchart showing toner reduction processing performed for each pixel.

FIG. 5 is a flowchart showing toner reduction processing which is performed for each pixel and executed by the toner reduction processing unit 306.

The sum (=C+M+Y+K+S1+S2: to be referred to as "total pixel value" hereinafter) of signal values in a pixel of interest is calculated (S501). It is determined whether the total pixel value exceeds a predetermined limit value in accordance with the device characteristic (S502). If the total pixel value≦the limit value, no toner reduction processing is necessary, and the processing advances to step S507.

If the total pixel value>the limit value, the RCR processing order (to be described later) is determined (S503), and RCR processing (to be described later) is done in accordance with the determined order (S504). After the RCR processing, the total pixel value is compared with the limit value (S505). If the total pixel value≦the limit value, the processing advances to step S507. If the total pixel value>the limit value even after the RCR processing, pixel value reduction processing (to be described later) is executed (S506).

Steps S501 to S506 are repeated until it is determined in step S507 that all pixels of an image to be processed have undergone toner reduction processing.

Note that signals input to the toner reduction processing unit 306 need not be C, M, Y, K, S1, and S2 signals, but C, M, Y, and K signals. In this case, the sum of C, M, Y, and K signals is calculated in step S501. In RCR processing of step S504, signal values corresponding to replaceable toner color signals may be replaced with the signal value of the toner of a spot color different from the process colors, or with the signal value of the toner of a color similar to the process colors.

<Determination of RCR Processing Order (S503)>

Figure 6:
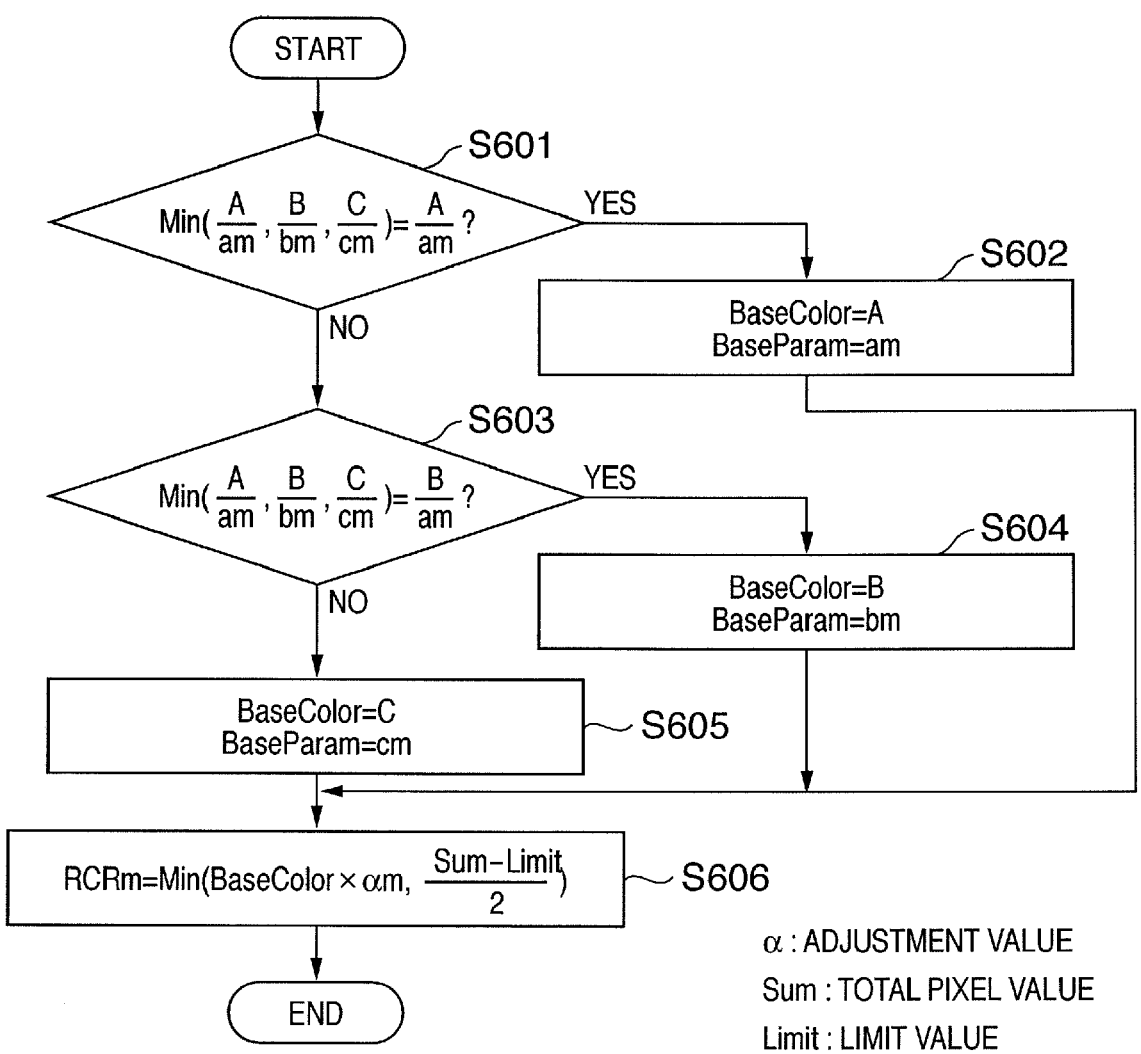
FIG. 6 is a flowchart showing processing of calculating an RCR amount when RCR processing is performed.

FIG. 6 is a flowchart showing processing of calculating an RCR amount, i.e., a replaceable toner color signal value when RCR processing (S504) is performed. In FIG. 6, "m" is a suffix representing a replaceable toner color. For example, for the replaceable toner color S1, am=a1, bm=b1, cm=c1, and αm=α1. For the replaceable toner color S2, am=a2, bm=b2, cm=c2, and am=a2.

Steps S601 to S605 are processing of selecting a base color for determining an RCR amount on the basis of the color component values A, B, and C (e.g., C, M, and Y) of a pixel of interest. More specifically, ratios A/am, B/bm, and C/cm are compared (S601 and S603), and a color component value (A, B, or C) representing the lowest ratio is set as a base color value BaseColor. The mixture ratio (am, bm, or cm) of the set color component value is set as a base parameter BaseParam (S602, S604, and S605).

The base color value and base parameter are used to determine an RCR amount RCRm by an equation shown in S606 of FIG. 6 (S606). Note that Sum in the equation shown in S606 of FIG. 6 represents the above-described total pixel value, and Limit represents the above-described limit value.

The processing shown in FIG. 6 is executed for each replaceable toner color. For example, when the table shown in FIG. 4 is held, replaceable toner colors are two colors S1 and S2, and RCR1 and RCR2 are determined.

Figure 7:
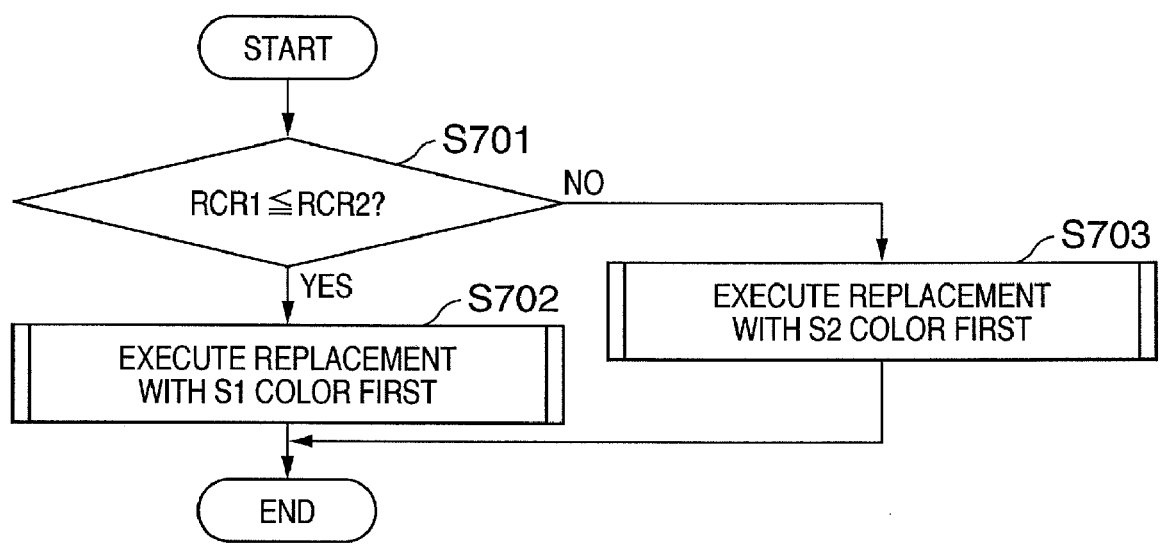
FIG. 7 is a flowchart for explaining determination of the RCR processing order.

FIG. 7 is a flowchart for explaining determination of the RCR processing order.

RCR1 and RCR2 serving as the RCR amounts of replaceable toner colors are compared (S701). The order is so determined as to first execute replacement with a replaceable toner color having a smaller RCR amount (S702 and S703).

In FIG. 7, the number of replaceable toner colors is two. Even when the number of replaceable toner colors is three or more, the RCR processing order is so determined as to execute RCR processing in descending order of the RCR amount.

By executing RCR processing in descending order of the RCR amount, pixel values can be replaced with many types of spot colors to prevent unbalanced use of a specific type of spot color.

<RCR Processing (S504)>

Figure 8:
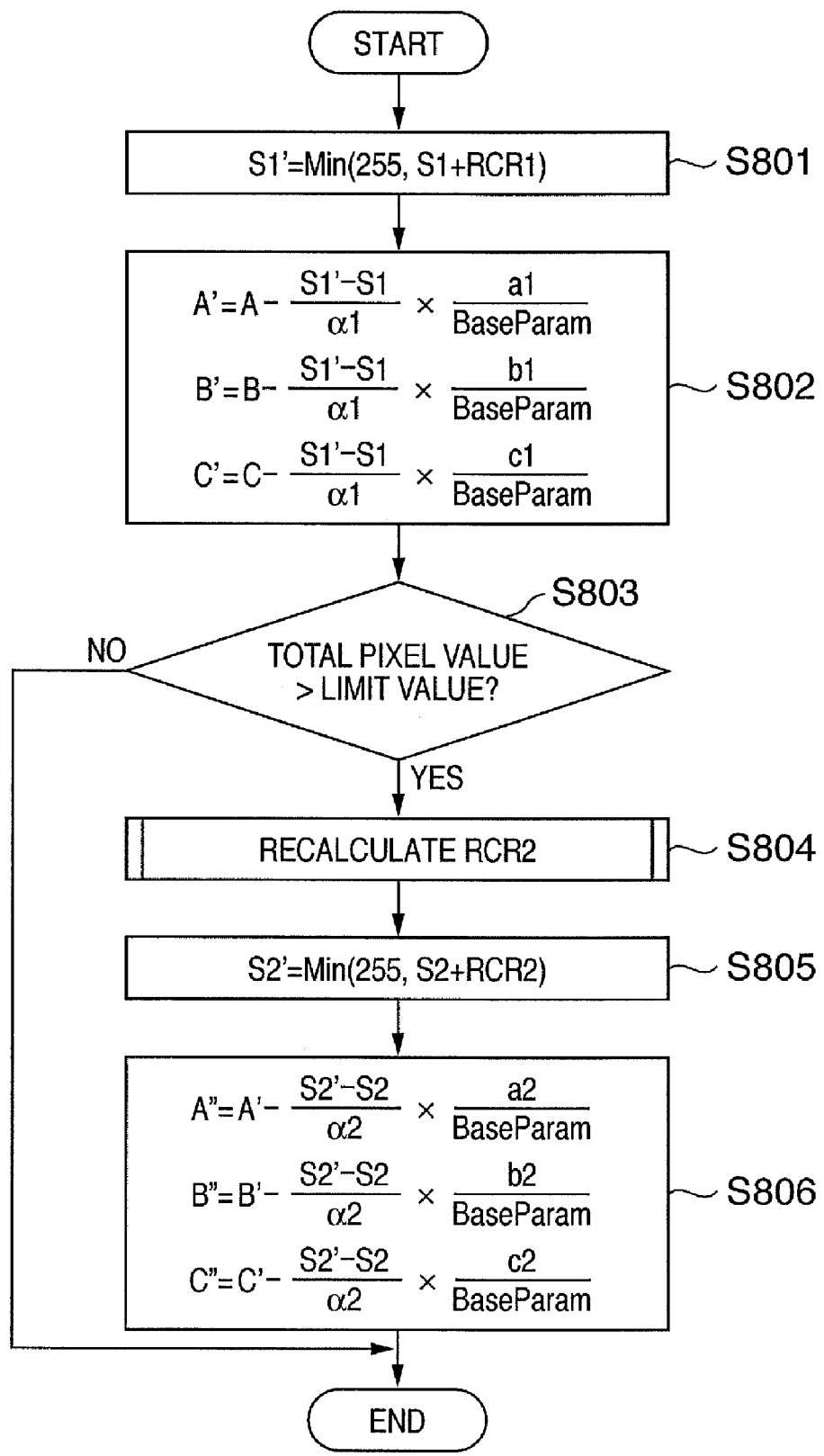
FIG. 8 is a flowchart for explaining RCR processing after the RCR processing order is determined.

FIG. 8 is a flowchart for explaining RCR processing after the RCR processing order is determined.

A case wherein RCR1<RCR2, i.e., replacement with the replaceable toner color S1 is first executed will be explained.

A color signal value S1' after RCR is determined (S801). This processing assumes 8 bits for each color, so the color signal value S1' after RCR is limited to 255 when the sum of RCR1 and the signal value S1 calculated by equation (1) exceeds 255.

Color signal values A', B', and C' after RCR are calculated (S802). That is, a value corresponding to a signal value added to the color signal S1 is subtracted from the color signal values A, B, and C by equations shown in step S802 of FIG. 8.

The total pixel value is calculated again and compared with a limit value (S803). If the total pixel value≦the limit value, the RCR processing ends. If the total pixel value>the limit value, RCR2 after RCR of the replaceable toner color signal S1 is calculated by the processing shown in FIG. 6 (S804). Similar to the replaceable toner color S1, a signal value S2' is determined (S805), and color signal values A", B", and C" after RCR are calculated (S806).

<Pixel Value Reduction Processing (S506)>

Figure 9:
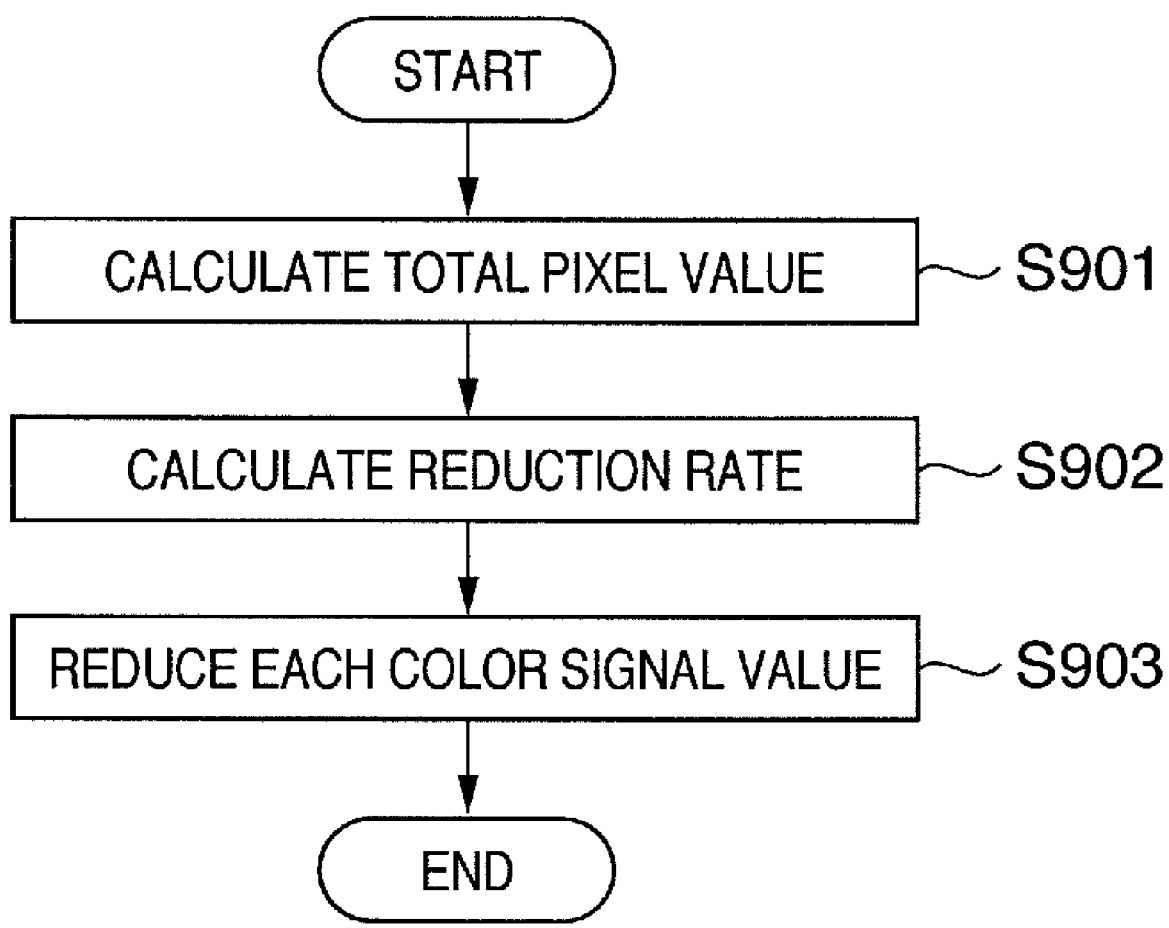
FIG. 9 is a flowchart for explaining pixel value reduction processing.

FIG. 9 is a flowchart for explaining pixel value reduction processing (S506).

The total pixel value is calculated (S901). A reduction rate Rate of each color signal is calculated (S902):

$$\text{Rate} = \text{Limit}/\text{Sum} \qquad (2)$$

where Sum: total pixel value
Limit: limit value

Color signal values are multiplied by the reduction rate Rate to reduce them at the same reduction rate (S903).

[Concrete Example]

A concrete example when replaceable toner colors are red R and green G will be explained. For descriptive convenience, a case wherein excessive signal values C, M, Y, K, S1, and S2 are input from an external computer or the like will be described.

FIG. 10 is a table showing a concrete example of a replacement table for a replaceable toner color. The table shown in FIG. 10 exhibits that the pixel value can be replaced with red R when the mixture ratio is cyan C:magenta M:yellow Y=0:1:1, and green G when the mixture ratio is 1:0:1.

FIGS. 11A to 11D are graphs showing how the signal value of a given pixel changes when toner reduction processing progresses on the basis of the table shown in FIG. 10. Changes of the pixel value will be sequentially explained using a limit value of 200.

Figure 11A:
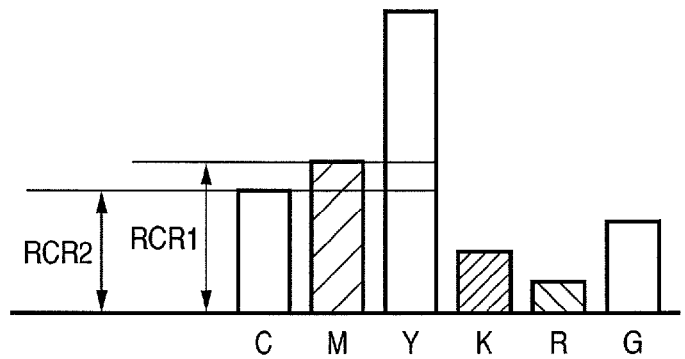
FIGS. 11A to 11D are graphs for explaining a concrete example of toner reduction processing.

FIG. 11A shows pixel values input to the toner reduction processing unit 306. The pixel values at this time are as follows:

C=102

M=128

Y=255

K=51

R=26

G=77

Sum=639.

According to the table shown in FIG. 10, the RCR amount RCR1 for replacing magenta M and yellow Y with red R, and the RCR amount RCR2 for replacing cyan C and yellow Y with green G are determined as follows. Since RCR1>RCR2, replacement with green G is executed first.

S1: BaseColor=M

RCR1=Min{128×1,(639−200)/2}

=Min{128,219.5}

=128

S2: BaseColor=C

RCR2=Min{102×1,(639−200)/2)}

=Min{102,219.5}

=102.

Figure 11B:
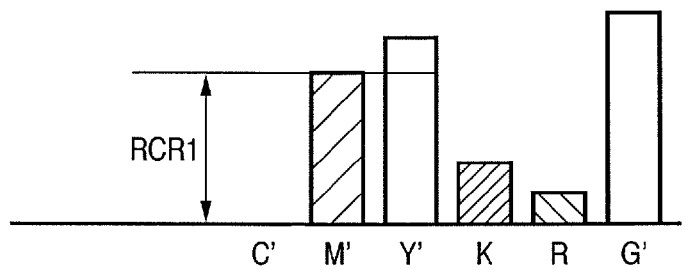

FIG. 11B shows pixel values after replacement with green G is executed. The pixel values at this time are as follows:

$C' = 102 - (179 - 77)/1 \cdot 1/1 = 0$ $M' = 128 - (179 - 77)/1 \cdot 0/1 = 128$ $Y' = 255 - (179 - 77)/1 \cdot 1/1 = 153$

K=51

R=26

$G' = 77 + 102 = 179$

Sum=537.

Then, replacement with red R is executed, and a recalculated RCR amount RCR1' changes as follows.

S1: BaseColor=M

RCR1'=Min{128×1,(537−200)/2}

=Min{128,168.5}

=128.

Figure 11C:
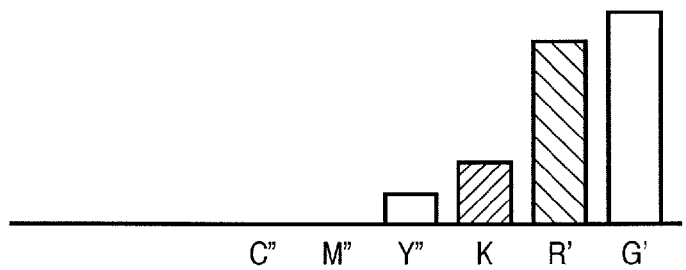

FIG. 11C shows pixel values after replacement with red R is executed. The pixel values at this time are as follows:

$C''$=0−(154−26)/1·0/1=0

$M'''$=128−(154−26)/1·1/1=0

$Y''$=153−(154−26)/1·1/1=25

K=51

$R'$=26+128=154

$G'$=179

Sum=409.

After that, the RCR processing ends. At this time, the total pixel value is 409, which exceeds the limit value of 200. Thus, pixel value reduction processing is executed.

Rate=200/409

C=0

M=0

$Y$=25×200/409=12

$K$=51×200/409=25

$R$=154×200/409=75

$G$=179×200/409=88

Sum=200.

Figure 11D:
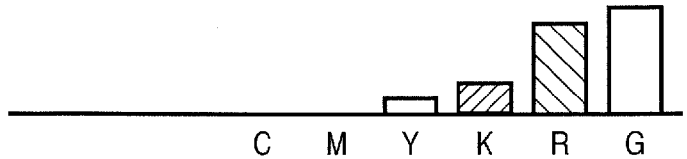

The pixel value reduction processing reduces the total pixel value to 200. FIG. 11D shows pixel values in this state. In this way, toner reduction processing can suppress a total pixel value corresponding to the total amount of toners used within a limit value while preventing a decrease in color reproduction.

As described above, in a printer using the color materials of colors more than four, C, M, Y, and K colors, the color material amount can be reduced within the limit value while the image quality is maintained.

Second Embodiment

Image processing according to the second embodiment of the present invention will be explained below. In the second embodiment, the same reference numerals as those in the first embodiment denote the same parts, and a detailed description thereof will be omitted.

The first embodiment has described processing which gives priority to color reproduction. However, when an image has a large amount of text, this processing may decrease the color density of the entire image, and color replacement may degrade text readability. Considering text readability, priority is desirably given to color replacement with black K toner which strongly influences the impression of the entire image. Processing which gives priority to replacement with K toner will be explained below.

FIG. 12 is a table showing an example of a table containing replacement with K toner. This table is prepared by adding, to the example of the table shown in FIG. 10, information with which a mixture of C, M, and Y at the same ratio is replaced with K toner.

Figure 13:
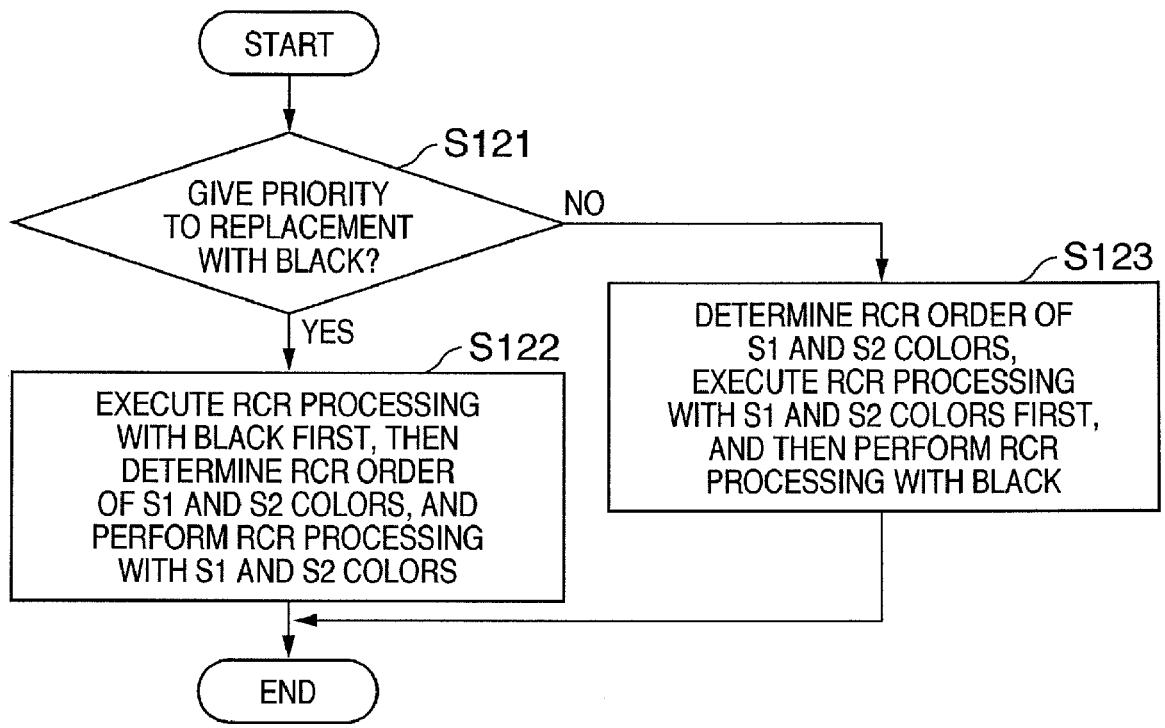
FIG. 13 is a flowchart showing toner reduction processing which considers a case wherein priority is given to replacement with K toner.

FIG. 13 is a flowchart showing toner reduction processing which considers a case wherein priority is given to replacement with K toner, and is executed by a toner reduction processing unit 306.

It is determined whether to give priority to replacement with black (K toner) (S121). For example, it is determined to give priority to replacement with K toner when "text" is designated as an image type and a printed material with a high contrast of a black text or the like is desired. When priority is given to replacement with K toner, RCR processing of replacing a pixel value with K toner is executed. Then, the RCR order of S1 and S2 colors (e.g., R and G toners) is determined, and RCR processing with S1 and S2 colors is performed (S122). If no priority is given to replacement with K toner, the RCR order of S1 and S2 colors (e.g., R and G toners) is determined, and RCR processing with S1 and S2 colors is performed. Then, RCR processing of replacing a pixel value with K toner is executed (S123).

Figure 14:
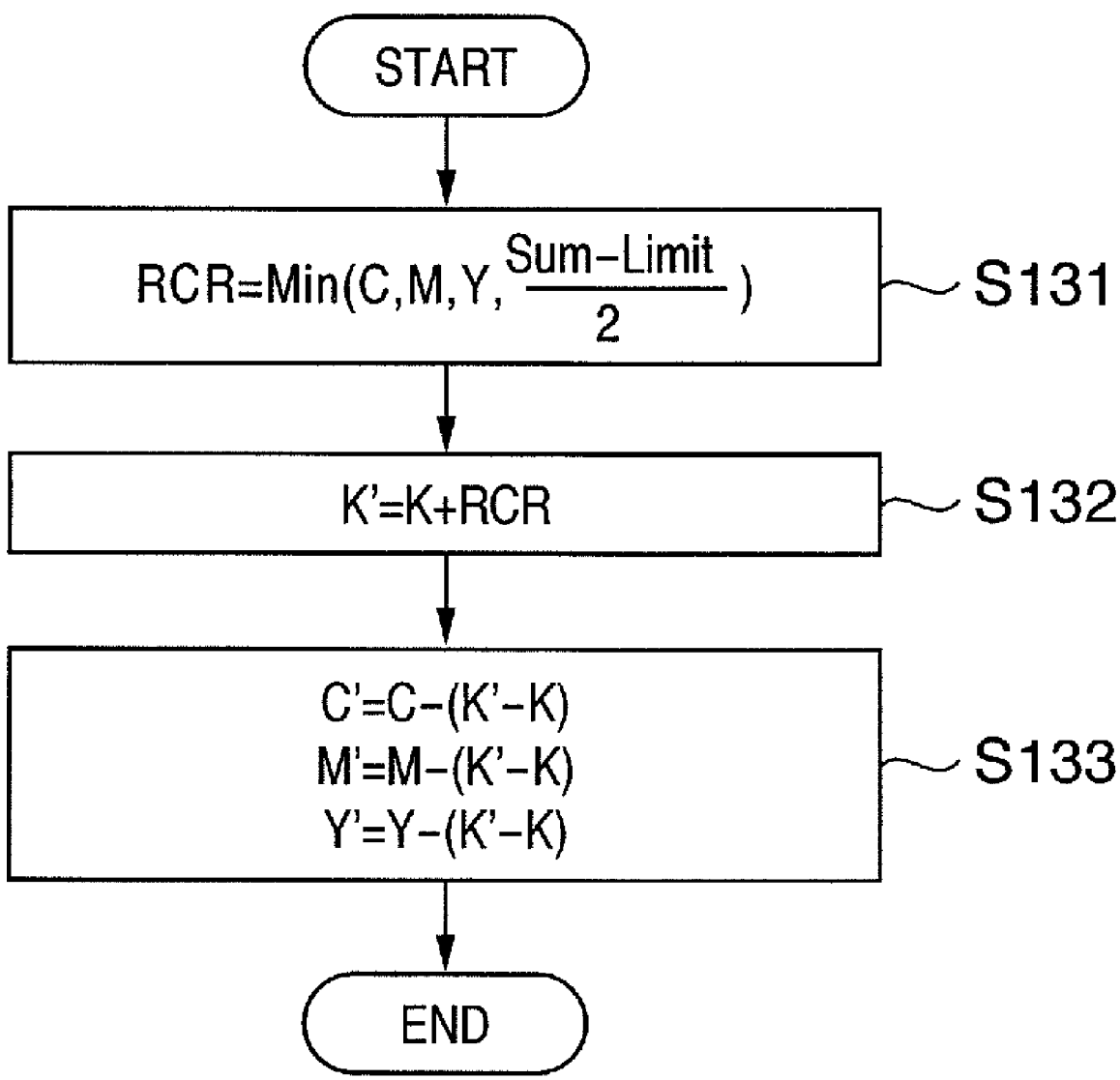
FIG. 14 is a flowchart showing RCR processing with K toner.

FIG. 14 is a flowchart showing RCR processing with K toner.

Each color signal value is compared with half (Sum−Limit)/2 of the difference between the total pixel value and the limit value, and the minimum value is set as an RCR amount (S131). A K' signal value is calculated by adding the RCR amount to a K signal value (S132). C', M', and Y' signal values are calculated by subtracting (K'−K) from C, M, and Y signal values (S133).

FIGS. 15A to 15D are graphs showing how the signal value of a given pixel changes by toner reduction processing which gives priority to replacement with K toner. Initial input values and a limit value are the same as those in the first embodiment.

Figure 15A:
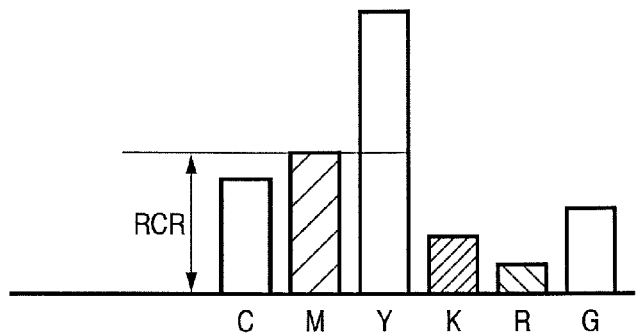
FIGS. 15A to 15D are graphs showing a concrete example of toner reduction processing.

FIG. 15A shows pixel values input to the toner reduction processing unit 306, similar to FIG. 11A. The pixel values at this time are as follows:

C=102

M=128

Y=255

K=51

R=26

G=77

Sum=639.

An RCR amount for replacing a pixel value with K toner is calculated by

RCR=Min{102,128,255,(639−200)/2}

=Min{102,128,255,219.5}

=102.

Figure 15B:
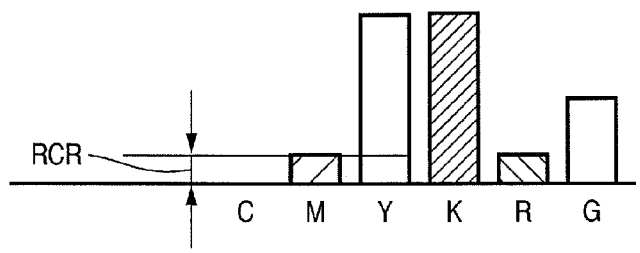

FIG. 15B shows pixel values after replacement with K toner is executed. The pixel values at this time are as follows:

$C'$=102−(153−51)=0

$M'$=128−(153−51)=26

$Y'$=255−(153−51)=153

$K=51+102=153$ $R=26$ $G=77$

Sum=435.

Then, the M and Y components are replaced with red R.

BaseColor=M $RCR1=\text{Min}\{26,(435-200)/2\}$ $=\text{Min}\{26,117.5\}$ $=26$.

Figure 15C:
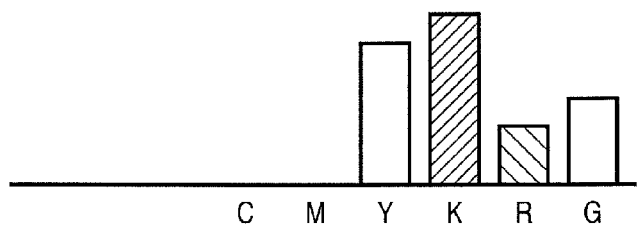
Figure 15D:
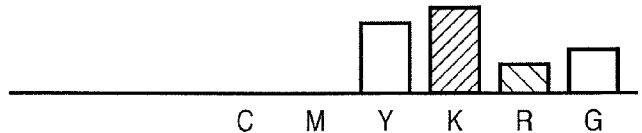

FIG. 15C shows pixel values after replacement with red R is executed. The pixel values at this time are as follows:

$C'=0$ $M''=26-(52-26)=0$ $Y''=153-(52-26)=127$ $K'=153$ $R'=26+26=52$ $G=77$

Sum=409.

Thereafter, the RCR processing ends. At this time, the total pixel value is 409, which exceeds the limit value of 200. Thus, pixel value reduction processing is executed.

Rate=200/409

$C=0$ $M=0$ $Y=127\times200/409=62$ $K=153\times200/409=75$ $R=52\times200/409=25$ $G=77\times200/409=38$ Sum=200.

In this fashion, toner reduction processing is executed by giving priority to K toner. A large signal value K of K toner=75 can be set in comparison with the signal value K of K toner=25 in the concrete example of the first embodiment. This processing can prevent a decrease in text readability or the like upon color replacement when an image has a large amount of text.

Modification of Embodiment

As described above, the image characteristic after toner reduction processing differs depending on whether to give priority to replacement with K toner. If processing is switched in one image on the basis of the feature of the image area or the object condition, a processing result of a higher image quality can be obtained.

For example, whether to give priority to replacement with K toner is switched in accordance with an image area signal obtained by feature amount determination for a raster image, or object information generated by interpreting PDL data.

FIG. 16 is a table showing an example of a switching condition table representing whether to give priority to replacement with K toner. According to the table in FIG. 16, when the image is a PDL object, priority is given to replacement with K toner for a text and line, but is not given for graphics and an image. When the image is a raster one, priority is given to replacement with K toner in the text area and inside the text, but is not given in the photograph area.

Whether to give priority to replacement with K toner may be switched on the basis of the communication protocol upon reception of image data.

FIG. 17 is a table showing an example of a table for switching, on the basis of the communication protocol, whether to give priority to replacement with K toner. According to the table in FIG. 17, when image data is received by facsimile or Internet FAX, the resolution is relatively often low, and output image processing for higher readability of information such as a text and thin line in an image is required. For this purpose, priority is given to replacement with K toner for image data received by facsimile or Internet FAX.

For image data received by a means other than facsimile or Internet FAX, no priority is given to replacement with K toner. Further, whether to give priority to replacement with K toner may be determined in accordance with the image characteristic by applying the table shown in FIG. 16 to image data received by a means other than facsimile or Internet FAX.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2005-224595, filed Aug. 2, 2005, which is hereby incorporated by reference herein in its entirety.

What is claimed is:

1. An image processing apparatus comprising:
   an input section, arranged to input an image signal representing a combination of colors including base colors and a spot color;
   a comparator, arranged to calculate a sum of signal values of colors in each pixel of the image signal, and to compare the sum of the signal values with a limit value; and
   a replacement section, arranged to, when the sum exceeds the limit value, replace signal values of the base colors with a signal value of the spot color based on a replacement table for replacing the signal values of the base colors with the signal value of the spot color,
   wherein the replacement table includes a relationship of replacement with the signal value of the spot color, and in addition a combination of the signal values of the base colors except black and a relationship of replacement with a signal value of black, and
   wherein said replacement section comprises a decider arranged to decide which of replacement with the spot color and replacement with black takes priority.

2. The apparatus according to claim 1, wherein the spot color includes at least one of light cyan, light magenta, a fluorescent color, a transparent color, red, and green.

3. The apparatus according to claim 1, wherein, when a plurality of spot colors are prepared, said replacement section determines a replacement order of the spot colors based on replacement amounts to the spot colors.

4. The apparatus according to claim 3, wherein said replacement section executes replacement with a small replacement amount prior to replacement with a large replacement amount.

5. The apparatus according to claim 1, wherein said replacement section comprises:

a calculator, arranged to calculate a replacement amount to the spot color based on the signal values of the base colors, the sum, the limit value, and the replacement table;
a determiner, arranged to, when a plurality of spot colors are prepared, determine a replacement order of the spot colors based on replacement amounts to the spot colors; and
a processor, arranged to execute the replacement for each spot color in the order in accordance with the replacement amounts.

6. The apparatus according to claim 5, wherein when the plurality of spot colors are prepared, said replacement section causes said comparator to execute the comparison every time the replacement is performed for one spot color, and when the sum becomes not larger than the limit value, ends the replacement.

7. The apparatus according to claim 5, wherein when the plurality of spot colors are prepared, said replacement section causes said comparator to execute the comparison every time the replacement is performed for one spot color, and when the sum exceeds the limit value, causes said calculator to calculate the replacement amount again for the next spot color represented by the order, and causes said processor to execute the replacement.

8. The apparatus according to claim 1, further comprising a reduction section, arranged to, after the replacement by said replacement section ends, cause said comparator to calculate a sum of signal values of the colors in each pixel of the image signal to which the replacement is applied and to execute the comparison, and when the sum exceeds the limit value, reduce the signal values of the colors of the image signal to which the replacement is applied at a reduction rate set based on the sum and the limit value.

9. The apparatus according to claim 1, wherein said decider makes the decision based on the basis of an image area determination result of a raster image or object information obtained by processing image data described in a description language.

10. The apparatus according to claim 1, wherein when said input section receives an image signal from outside the apparatus, said decider makes the decision based on a type of communication protocol used to communicate the image signal.

11. An image processing apparatus comprising:
    an input section, arranged to input an image signal representing process colors;
    a comparator, arranged to calculate a sum of signal values of colors in each pixel of the image signal, and compare the sum of the signal values with an upper limit value; and
    a replacement section, arranged to, when the sum exceeds the upper limit value, replace signal values of the process colors with a signal value of a spot color based on the basis of a replacement table for replacing the signal values of the process colors with the signal value of the spot color different from the process colors,
    wherein the replacement table includes a relationship of replacement with the signal value of the spot color, and in addition a combination of the signal values of the process colors except black and a relationship of replacement with a signal value of black, and
    wherein said replacement section comprises a decider arranged to decide which of replacement with the spot color and replacement with black takes priority.

12. The apparatus according to claim 11, wherein, when a plurality of spot colors are prepared, said replacement section determines a replacement order of the spot colors based on replacement amounts to the spot colors.

13. The apparatus according to claim 12, wherein said replacement section executes replacement with a small replacement amount prior to replacement with a large replacement amount.

14. An image processing method comprising the steps of:
inputting an image signal representing a combination of colors including base colors and a spot color;
calculating a sum of signal values of colors in each pixel of the image signal to compare the sum of the signal values with a limit value; and
replacing, when the sum exceeds the limit value, signal values of the base colors with a signal value of the spot color based on a replacement table for replacing the signal values of the base colors with the signal value of the spot color,
wherein the replacement table includes a relationship of replacement with the signal value of the spot color, and in addition a combination of the signal values of the base colors except black and a relationship of replacement with a signal value of black, and
wherein the replacing step includes the step of deciding which of replacement with the spot color and replacement with black takes priority.

15. The method according to claim 14, wherein in the replacement step, when a plurality of spot colors are prepared, a replacement order of the spot colors is determined based on replacement amounts to the spot colors.

16. The method according to claim 15, wherein in the replacement step, replacement with a small replacement amount is executed prior to replacement with a large replacement amount.

17. An image processing method comprising the steps of:
inputting an image signal representing process colors;
calculating a sum of signal values of colors in each pixel of the image signal to compare the sum of the signal values with an upper limit value; and
replacing, when the sum exceeds the upper limit value, signal values of the process colors with a signal value of a spot color based on a replacement table for replacing the signal values of the process colors with the signal value of the spot color different from the process colors,
wherein the replacement table includes a relationship of replacement with the signal value of the spot color, and in addition a combination of the signal values of the process colors except black and a relationship of replacement with a signal value of black, and
wherein the replacing step includes the step of deciding which of replacement with the spot color and replacement with black takes priority.

18. A computer-readable storage medium storing a computer-executable program for causing a computer to execute an image processing method, the method comprising the steps of:
inputting an image signal representing a combination of colors including base colors and a spot color;
calculating a sum of signal values of colors in each pixel of the image signal to compare the sum of the signal values with a limit value; and
replacing, when the sum exceeds the limit value, signal values of the base colors with a signal value of the spot color based on a replacement table for replacing the signal values of the base colors with the signal value of the spot color,
wherein the replacement table includes a relationship of replacement with the signal value of the spot color, and in addition a combination of the signal values of the base colors except black and a relationship of replacement with a signal value of black, and
wherein the replacing step includes the step of deciding which of replacement with the spot color and replacement with black takes priority.

19. A computer-readable storage medium storing a computer-executable program for causing a computer to execute an image processing method, the method comprising the steps of:
inputting an image signal representing process colors;
calculating a sum of signal values of colors in each pixel of the image signal to compare the sum of the signal values with an upper limit value; and
replacing, when the sum exceeds the upper limit value, signal values of the process colors with a signal value of a spot color based on a replacement table for replacing the signal values of the process colors with the signal value of the spot color different from the process colors,
wherein the replacement table includes a relationship of replacement with the signal value of the spot color, and in addition a combination of the signal values of the process colors except black and a relationship of replacement with a signal value of black, and
wherein the replacing step includes the step of deciding which of replacement with the spot color and replacement with black takes priority.

* * * * *